United States Patent

Kobayashi et al.

[11] Patent Number: 5,848,506
[45] Date of Patent: Dec. 15, 1998

[54] ACCESS FLOOR SYSTEM

[75] Inventors: Tokuzo Kobayashi; Takaaki Akagi, both of Okayama; Manabu Kanzaki, Sojya, all of Japan

[73] Assignee: Om Kiki Kabushiki Kaisha, Okayama, Japan

[21] Appl. No.: 737,385

[22] PCT Filed: Dec. 25, 1995

[86] PCT No.: PCT/JP95/02672

§ 371 Date: Feb. 18, 1997

§ 102(e) Date: Feb. 18, 1997

[87] PCT Pub. No.: WO96/27720

PCT Pub. Date: Sep. 12, 1996

[30] Foreign Application Priority Data

Mar. 6, 1995 [JP] Japan .................................. 7-074442
Apr. 27, 1995 [JP] Japan .................................. 7-129419
Aug. 14, 1995 [JP] Japan .................................. 7-229663

[51] Int. Cl.⁶ .................................................. E04C 2/52
[52] U.S. Cl. ........................... 52/220.2; 52/98; 52/220.5; 52/220.8
[58] Field of Search .................. 52/98, 100, 126.2, 52/126.5, 126.6, 220.1, 220.2, 220.3, 220.5, 220.8

[56] References Cited

U.S. PATENT DOCUMENTS

| | | | |
|---|---|---|---|
| 2,950,575 | 8/1960 | Hellwig | 52/220.1 X |
| 3,290,884 | 12/1966 | Rushton et al. | 52/471 X |
| 4,656,795 | 4/1987 | Albrecht et al. | 52/126.6 |
| 4,773,196 | 9/1988 | Yoshida et al. | 52/200.1 X |
| 4,850,163 | 7/1989 | Kobayashi et al. | 52/220.3 X |
| 4,934,116 | 6/1990 | Frederiksen | 52/220.3 |
| 5,031,369 | 7/1991 | Kobayashi et al. | 52/126.6 |
| 5,184,438 | 2/1993 | Takeda et al. | 52/220.3 |
| 5,263,289 | 11/1993 | Boyd | 52/220.5 X |
| 5,386,670 | 2/1995 | Takeda et al. | 52/220.2 X |
| 5,434,355 | 7/1995 | Sho | 52/220.3 X |
| 5,489,458 | 2/1996 | Sato et al. | 52/220.8 X |
| 5,628,157 | 5/1997 | Chen | 52/220.5 X |
| 5,630,300 | 5/1997 | Chen | 52/220.5 |

FOREIGN PATENT DOCUMENTS

| | | |
|---|---|---|
| 0 367 176 | 5/1990 | European Pat. Off. . |
| 0 411 568 | 2/1991 | European Pat. Off. . |
| 63-192537 | 12/1988 | Japan . |
| 3-29641 | 3/1991 | Japan . |
| 2 190 936 | 12/1987 | United Kingdom . |

Primary Examiner—Carl D. Friedman
Assistant Examiner—Kevin D. Wilkens
Attorney, Agent, or Firm—Irving M. Fishman; Michael J. Brown

[57] ABSTRACT

An access floor system comprising (1) block panels made up of one or more panel units, (2) a groove structure defined by adjacent block panels, the groove structure capable of containing wiring, (3) lid panels for covering the groove structure, and (4) central locking plates to cover the spaces remaining at the juncture of lid panels and to lock the assembly together.

9 Claims, 11 Drawing Sheets

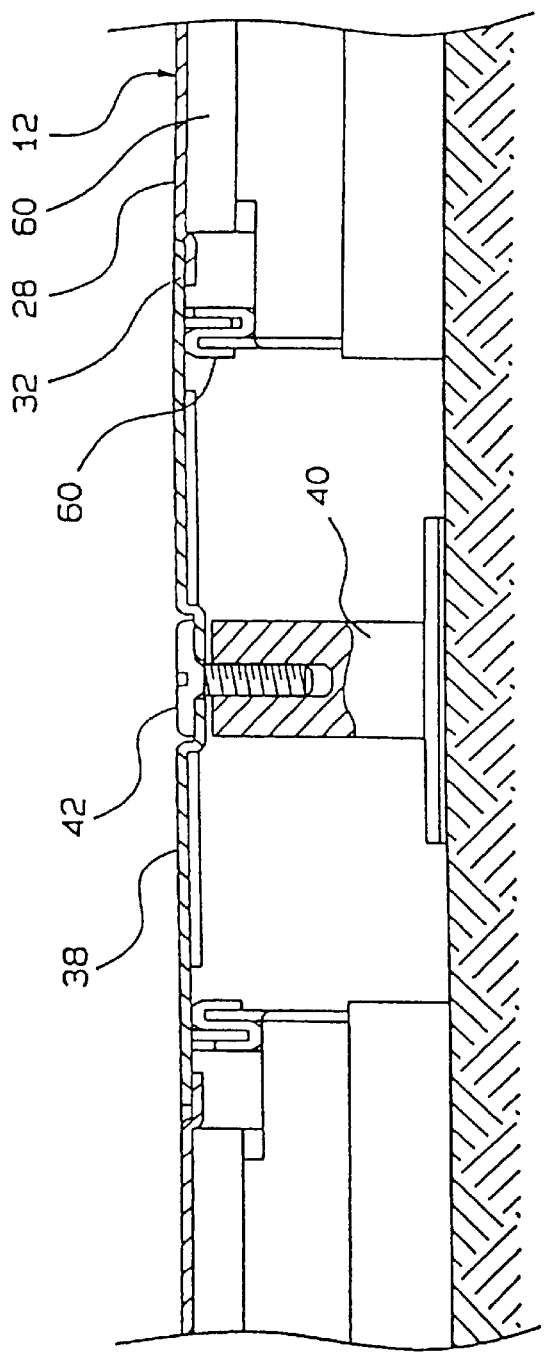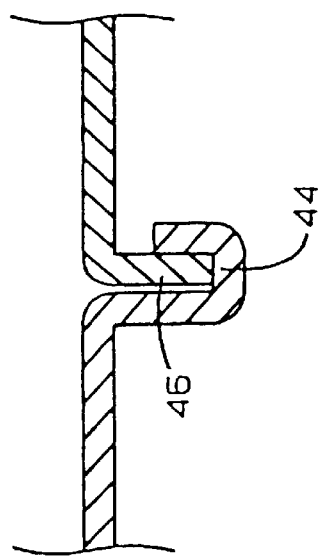

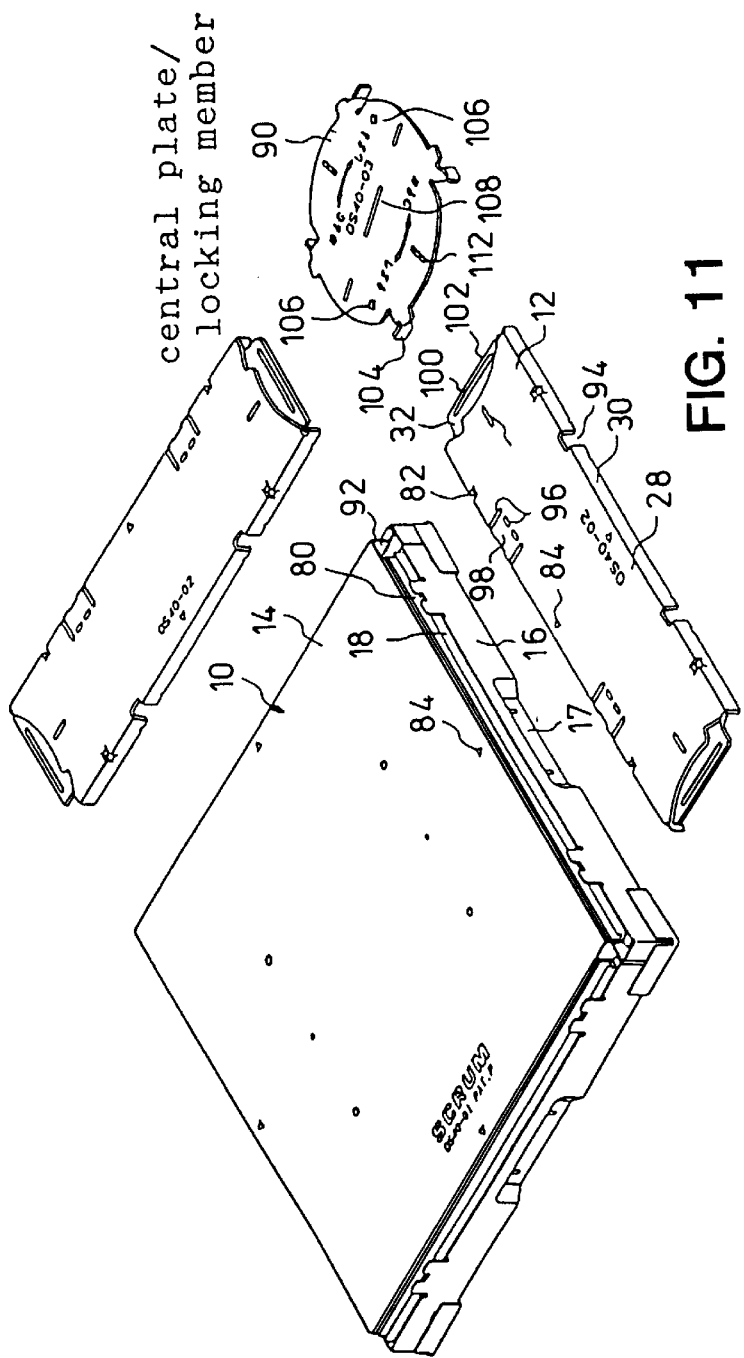
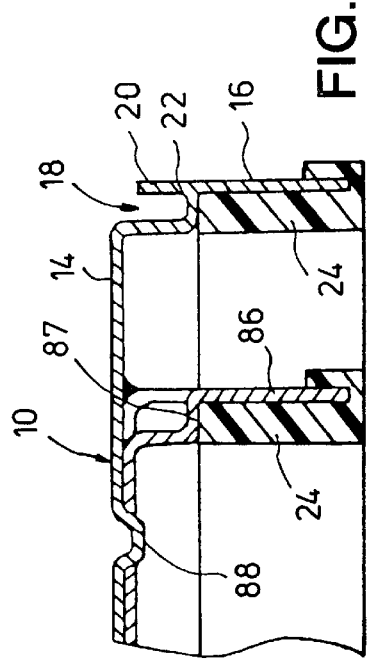
FIG. 11
FIG. 12

ACCESS FLOOR SYSTEM

TECHNICAL FIELD

The present invention relates to an access floor having a lengthwise and breadthwise groove structure between floor panels units or blocks wherein wiring is arranged in the lengthwise and breadthwise grooves between the floor panels.

BACKGROUND ART

There are two types access flooring structures: panel structure and groove structure. When remodeling an ordinary floor into an access floor, the groove structure is more often adopted whereby the space for wiring can be secured to the floor at a lower elevation than the panel structure. As examples of access floor with a groove structure, Japanese Utility Model Application Laid-open No. 3-29641 discloses an arrangement wherein the wiring space is provided between square panel blocks composed of triangular shaped panel units and covered by flat lid plates. Another Japanese Utility Model Appln discloses an arrangement wherein one or two wiring groove(s) is(are) formed inside the square panel and such groove(s) is(are) covered by flat lid plate(s).

According to the former example, legs are formed on the back of corners of each panel unit, and adjoining legs are combined by holder plates which can be bent to comply with the irregularity of the structural floor with its own weight. The upper portion of the panel is combined only by a partial binding member which is provided at the four corners of rectangular cover plates so that the panels can be removed easily. In this formation, the holder plate is apt to be distorted during transport and other handling, and the relative position of units comprising a panel cannot be properly fixed. Moreover, as the cover plate does not change shape, the partially bound portion of the panel is easily torn off with the distortion of the holder plate portion. As such, it is difficult to maintain the square shape of a panel which causes hardship in handling and often production of noise as well. A weak and insufficient connection easily leads to displacement during earthquakes or other shaking. The connection may be improved by cutting out a portion of the flat cover plate and fixing that portion to each panel unit to temporally fix their positions, but this does not sufficiently solve all the above-mentioned problems.

According to the latter example, the bottom of the wiring groove is made thin and flexible so that the groove can be made to comply with the irregularity of the structural floor. This causes the easy deformation of the floor as the relative positions of the grooves are not fixed. Even when the cover plates are placed and a wide floor is constructed, grooves are not connected with each other and apt to produce noise or easily slip off during earthquakes and other shaking.

DISCLOSURE OF THE INVENTION

The present invention aims to solve these problems by providing an access floor with a groove structure which can be placed in compliance with the irregularity of the structural floor; with the grooves being connected with each other with sufficient strength; eliminating unsteadiness and its enhancing its capacity to resist earthquakes and other shaking; which can be manufactured at a lower net cost and which can be easily handled and assembled.

In order to achieve the above-mentioned object, the present invention provides an access floor system with a groove structure for wiring wherein the groove is formed between a plurality of panel blocks. The panel blocks are composed of panel units and placed in squares on the structural floor. The groove structure is covered by lid panels, the panel block has a flat upper surface, sidewalls and slot inserts of U-letter shape which are formed at a middle portion of the sidewall and into which the vertical walls of the lid panels are inserted. The lid panel has a horizontal wall and the aforementioned vertical walls hang downward therefrom.

As the vertical walls of the lid panels are held by the slot insert of the panel blocks, noises are eliminated and the capacity to resist earthquakes and other shaking is strengthened. Further, as panel blocks and lid panels are interconnected with each other, there is no divergence produced while assembling the access floor, and the relative position of panel blocks and lid panels are fixed. Hence, it is unnecessary to draw lines on the floor and place panel blocks down first. It is possible to assemble panel blocks and lid panels alternately.

BRIEF DESCRIPTION OF DRAWINGS

FIG. 6 is a partial sectional view showing a central plate and lid panels in accordance with the present invention.

FIG. 7 is a partial sectional view showing the connecting portion of a central plate and a lid panel in accordance with the present invention.

FIG. 11 is a perspective view showing a panel block, two lid panels and a locking member/central plate in accordance with the present invention.

FIG. 12 is a partial sectional view of a panel block in accordance with the present invention.

BEST MODE FOR CARRYING OUT THE INVENTION

An embodiment of the present invention is described below with reference to the accompanying drawings.

Figure 1:
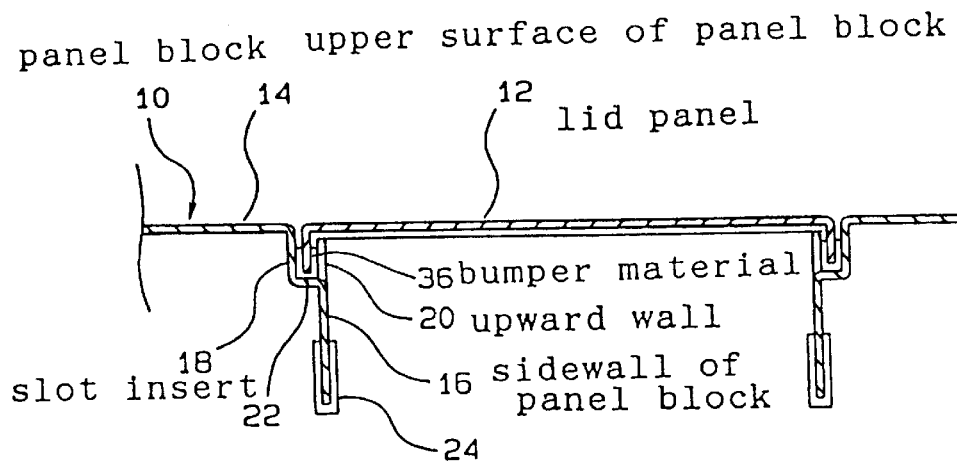
FIG. 1 is a partial sectional view showing panel blocks and a lid panel in accordance with the present invention.
Figure 2:
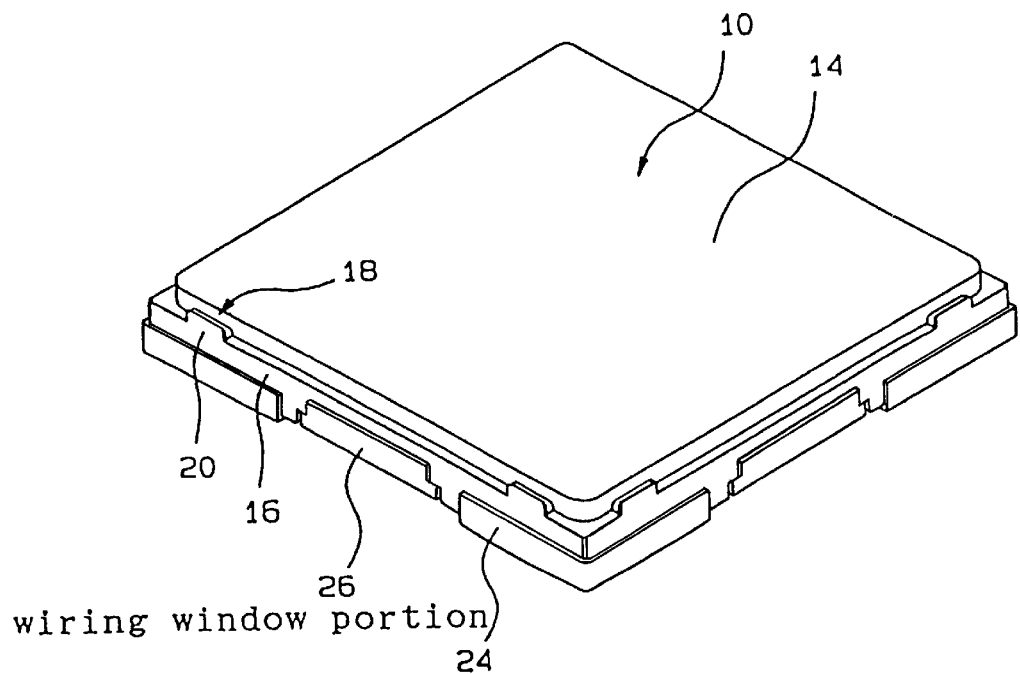
FIG. 2 is a perspective view of a panel block in accordance with the present invention.
Figure 3:
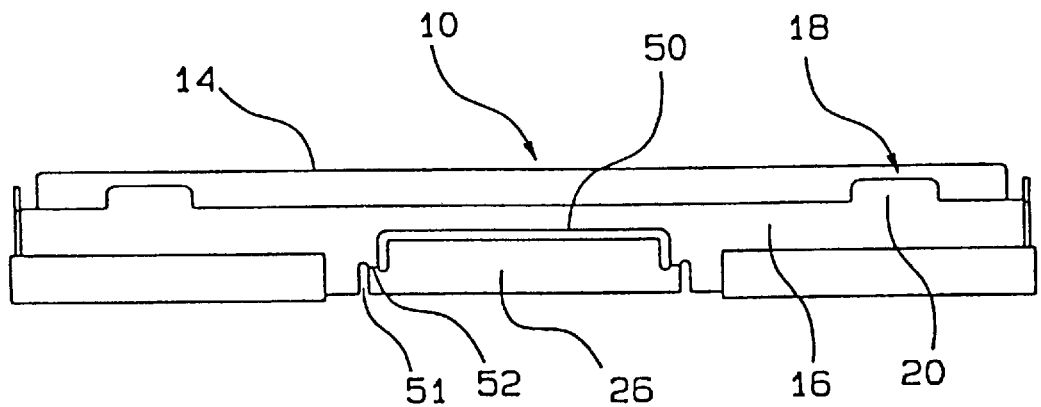
FIG. 3 is a frontal view of a panel block in accordance with the present invention.

FIG. 1 is a partial sectional view of an access floor showing one embodiment of the present invention. FIG. 2 is a perspective view of a panel block and FIG. 3 is a front view thereof. The access floor according to the present invention provides grooves between panel blocks 10 and covers the grooves with lid panels 12. Panel blocks 10 and lid panels 12 are made to constitute the same surface. The panel block of square shape mentioned here includes those composed of a single panel unit of square shape as in the present embodiment, those composed of an assembly of panel units to form a square, and those composed of two triangular panel units to form a square. A panel block need only be square when assembled from panel units. When combining a plurality of panel units, they must be connected by some means. Connection can be done either by providing each unit with proper means and connecting them directly, or, by affixing panel units to a sheet or other base and thus connecting them indirectly. In the latter case, if gaps are provided between panel units, such gaps can be utilized as the wiring grooves and arrangement of wires in a diagonal direction also becomes possible.

Panel block 10 has flat upper surface 14 and sidewall 16 hanging therefrom. In a middle portion of sidewall 16, there are provided slot inserts 18 of U-letter shape into which the vertical wall of lid panel 12 is inserted and held. The middle of sidewall 16 mentioned here refers to any point within the thickness of panel block 10. The size of panel block 10 should be a size which can absorb the irregularity of the structural floor and which is desirably no more than 300 millimeters(mm) on one side. However, as panel blocks composed of triangular panel units can absorb the irregularity with three point support, such panel blocks may be more than 300 mm. The thickness of panel block 10, which is the same as the height of sidewall 16 and which also corresponds to the depth of wiring groove, is desirably between about 30 mm to 50 mm in accordance with the volume of wiring or the size of table taps, plugs and other equipments to be used.

Slot inserts 18 are formed in U-letter shape by bending sidewall 16 into a step-like shape and, then, by providing upward wall 20 from the edge of the step along sidewall 16. The vertical wall of lid panel 12 is inserted in the resultant U-letter shaped slot and the end of the vertical wall is placed on the bottom of slot insert, so the bottom constitutes a holding floor 22 for the vertical wall. It is desirable to determine the position of slot insert 18 so as to make holding floor 22 between 10 mm to half the thickness of panel block 10 lower than upper surface 14 in relation to the length of the vertical wall. The height of upward wall 20 should be about 2 to 3 mm shorter than the height of slot insert 18 so that the interference with lid panel 12 can be avoided. If slot insert is made at too low a position, there is increased danger that the wiring will be erroneously placed on the holding floor 22 and be crushed by the vertical wall of lid panels. If the position of the slot insert is too high, the vertical wall of lid panel 12 must be made shorter, which could weaken the structure or cause lid panels to come off. It is not necessary to form slot insert 18 along the entire length of sidewall 16, but partially is sufficient. Similarly, the holding floor may be provided partially along the sidewall.

Bumper member 24, made of plastic material, may be attached at the foot of sidewall 16 of panel block 10 for the purpose of eliminating noise caused by the irregularity of the structural floor. Bumper member 24 may be dispensed with and substituted by a bumper sheet to be laid on the structural floor. Also, a wiring window portion 26 may be impressed on sidewall 16 of panel block 10. The wiring window portion 26 may be removed by bending it and snapping it off. As shown in FIG. 3, the frame of this window portion may be composed of slit 50 and cuts 51, the connecting bridge portion 52 between the slit and cuts may be made narrow and thin for easy removal. The shape and size of wiring window may be determined freely, but, being a supplemental wiring space, about 30 mm in width and 15 mm in height will suffice. If the bumper member 24 is attached to the place where the wiring window is to be opened, it will be necessary to remove the bumper member of that portion. If panel block 10 and lid panel 12 are made of steel plate, press processing will produce fireproof products with high productivity. Upward wall 20 may be provided by cutting a portion of holding floor 22 and bending upward.

Figure 4:
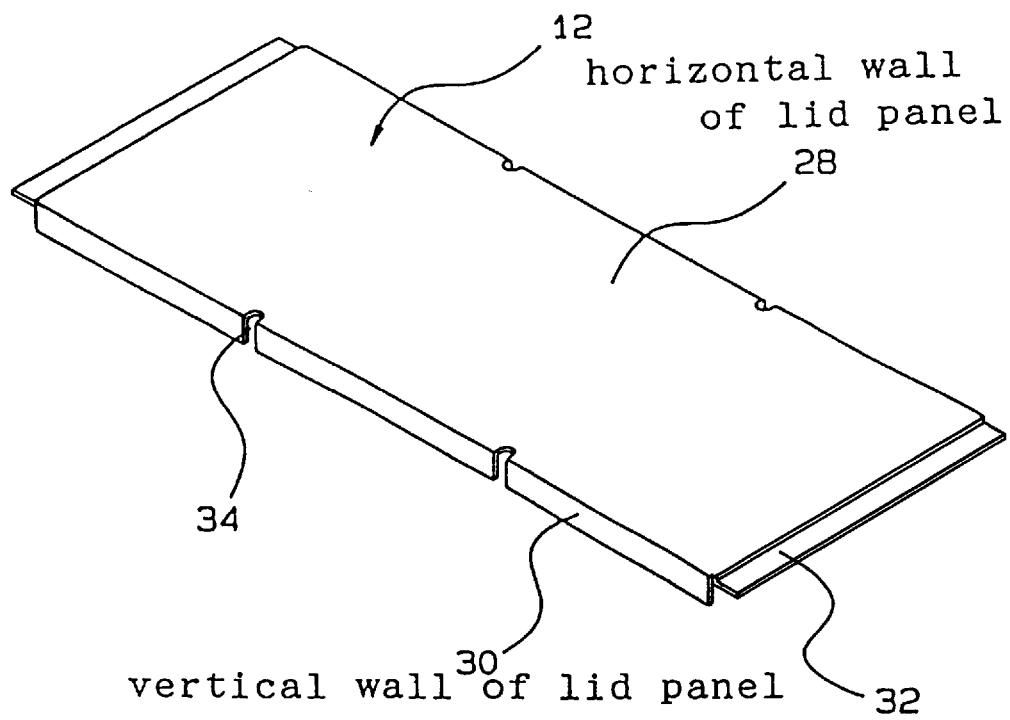
FIG. 4 is a perspective view of a lid panel in accordance with the present invention.

FIG. 4 is a perspective view of lid panel 12 which has a horizontal wall 28 and vertical walls 30 hanging downward therefrom on both of the longer sides. When lid panel 12 is connected with the central plate, a short lowered step 32 is formed at both breadth ends. The width of horizontal wall 28 may suitably be between about 50 to 100 mm in consideration of necessity of covering the wiring groove and of housing wiring equipments within the groove. The height of vertical wall 30 may be from about 10 mm to half of the thickness of panel block 10 in consideration of the strength of lid panel 12 as a whole and must be about 2 to 3 mm longer than the upward wall 20 with the view to avoid interference between horizontal wall 28 and upward wall 20. The upper surface 14 of the panel block and horizontal wall 28 of the lid panel are made to constitute parts of the same surface. By inserting vertical wall 30 in slot insert 18 with sufficient depth, the two are connected and strongly held in place and would not come apart even with a certain degree of shaking.

The length of lid panel 12 is usually made to be the same length as one side of panel block 10, but it may be longer or shorter. However, as a gap of the same length as that of one side of panel block 10 is produced between panel blocks, lid panels of the same length as one side of panel block 10 are also required. In order that lid panels 12 properly fit panel blocks 10, it is desirable to provide apertures 34 on lid panels with 100 to 150 mm interval. Apertures 34 should start from the bottom of vertical wall 30 on both sides and should extend to a portion of horizontal wall 28 to enable lid panels to bend to a certain extent whenever needed. Taking into account these provisions, lid panels 12 may be as long as about 500 mm.

Figure 5:
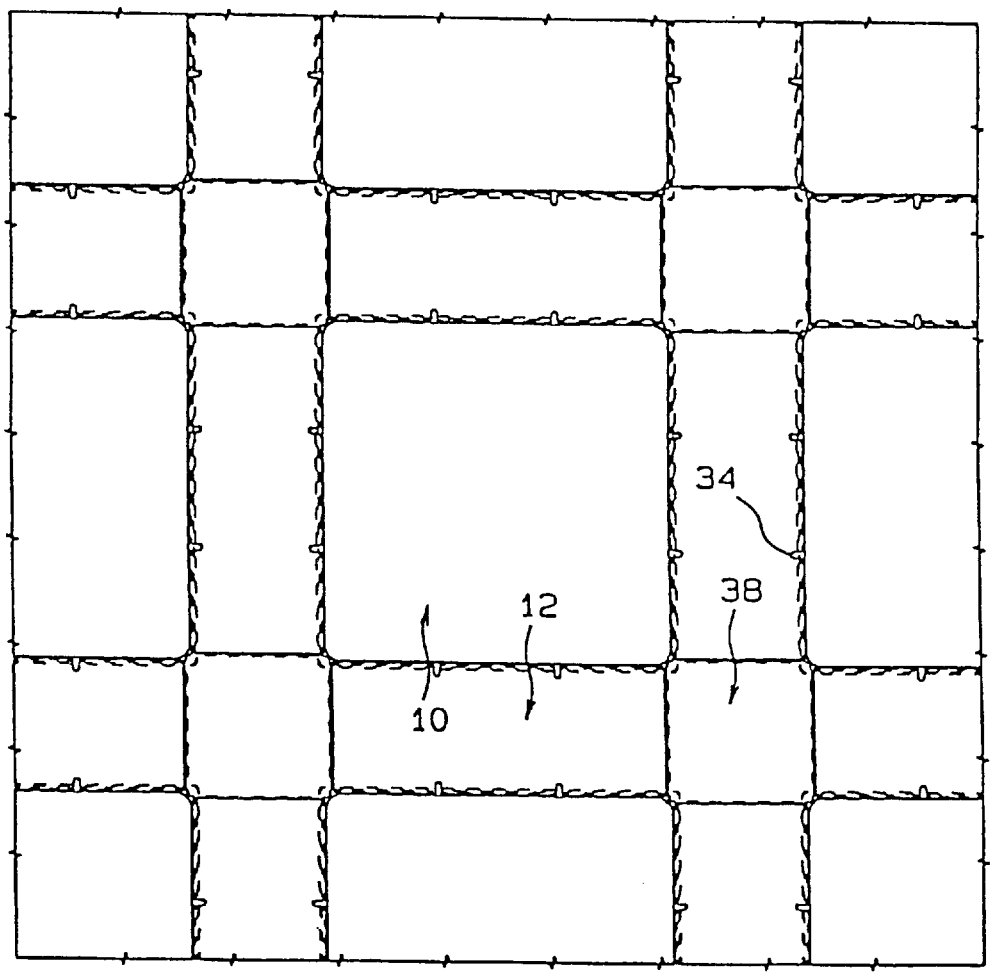
FIG. 5 is a plan view showing an of access floor in accordance with the present invention.

FIG. 5 is a plan view of the access floor which is composed of the above-mentioned panel blocks 10 and lid panels 12. For assembling this floor, vertical wall 30 of lid panel 12 is inserted in slot insert 18 of panel block 10. U-shaped slot insert 18 catches hold of vertical wall 30. Thus, the relative positioning of panel blocks 10 and lid panels 12 are determined together, thereby preventing the coming apart or sliding off even if some shaking is applied. Furthermore, lid panels 12 fit better and better suppress noise in this arrangement. By attaching bumper material 36 to vertical wall 30 of lid panel 12, and by catching hold of bumper material 36 more tightly in slot insert 18 (FIG. 1), improved results can be expected in preventing lids panels 12 from coming off and in the suppression of noise.

When lid panel 12 has the same length as panel block 10, a square space at the corner of panel blocks is produced. This square space is covered by central plate 38. FIG. 6 shows a cross sectional view of this portion wherein the edge of central plate 38 is placed on the aforementioned lowered step 32 of lid panel 12 and central plate 38 is locked to support stand 40 from above with locking member 42. By so doing, the whole structure is connected strongly together resulting in increased shake-proofing. Support stand 40 may be made of aluminium die casting or similar materials and may be fixed to the structural floor by two-sided adhesive tape or other means. The locking means in FIG. 6 is by screwing, but a cam system may realize quicker locking.

FIG. 6 shows another embodiment of bumper material which is different from that of 36 in FIG. 1. In this embodiment, bumper material 60 covers up to the upper portion of upward wall 20, whereby the top of upward wall 20 is made to constitute the holding floor for lid panel 12. For this purpose, it may be more stable if the top of upward wall 20 has a certain width.

FIG. 7 is a cross sectional view of another embodiment showing the relationship between central plate 38 and lid panel 12 where, instead of providing a lowered step, U-shaped groove 44 is formed at the end of lid panel 12, and vertical wall 46 is formed at the end of central plate 38 to be inserted into groove 44, thus strengthening the combination.

Upon completion of the aforementioned construction, wiring is made by utilizing the grooves under lid panels 12. If the wiring is placed on the holding floor 22 of panel block 10, there is a danger that wiring may be damaged when lid panel 12 is assembled. In order to prevent such a danger, a wiring guard like a channel may be placed in the space beneath lid panel 12 (not shown in the drawings). Even without such facilities provided, upward wall 20 of slot insert 18 plays the roll of a guide to lead the wiring to the normal position and sufficiently guard the wiring.

FIG. 11 is a perspective view of an embodiment in which the design of panel block 10, lid panel 12 and central plate 38 are slightly different from the aforementioned embodiments. This embodiment is characterized by provision of a notch 80 in the middle of upward wall 20 of panel block 10 and provision of indentation 82 at the corresponding position of lid panel 12, thereby connecting the panel block and lid panel. This connection can regulate the correct position of lid panel 12 in the length direction. Also, by engraving adjusting marks 84 at appropriate points of both panels, the assembly of lid panel 12 becomes easier. In the rear surface of panel block 10, reinforcement board 86 is attached by screwing or spot welding (FIG. 12). In this case, indentation 88 is provided on the under surface of panel block 10 and is fixed into the hole provided on reinforcement board 86, thereby determining the mutual positions of the respective parts. When using reinforcement board 86, the thickness of panel block 10 may be reduced.

Figure 18:
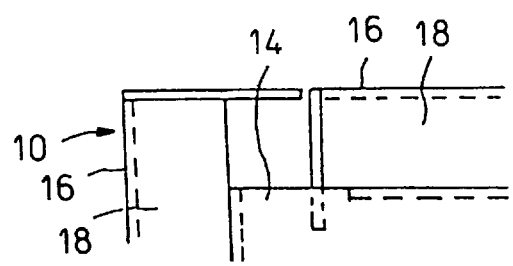
FIG. 18 is a schematic plan view of a principal portion of a corner of a panel block in accordance with the present invention.

The central portion of sidewall 16 of panel block 10 is indented inwardly towards the center of panel block to form dent 17. The depth of this dent is made so that sidewall 16 is kept on the same line as or inside of the outer edge of upper surface 14 of panel block 10 and thereby sidewall 16 can resist the load from above and can prevent outward opening of sidewall 16. Also, the break of sidewall 16 is not at each corner, but is made to be off the corner. FIG. 18 is a partial plan view of the corner portion of panel block 10, wherein the end of one sidewall 16 is extended past the corner at a right angle, and the end of adjoining sidewall is bent at a right angle towards the inside before the end of adjoining sidewall. The end of sidewall 16 which was bent towards the inside is made to reach the same line as the outer edge of upper surface 14 or inside of that line. This is for the prevention of outward opening of sidewall 16 in resistance against a load from above, as in the case with the above-mentioned dent 17. At the corner portion of sidewall 16, there is provided an opening 92 for a part of locking member/central plate 90 (hereinafter referred to as locking member) to be inserted as will be explained later. Further, at the foot of sidewall 16 on the corner portion, bumper member 24 is attached as was in the aforementioned embodiment. In the embodiment shown in FIG. 12, the inside portion of bumper member 24 is extended upward to support holding floor 22. Bumper member 24 is also attached to reinforcement board 86, wherein the edge of reinforcement board 86 is bent at some points to form lowered step 87. The extended bumper member 24 supports the under surface of lowered steps 87 to reduce the load per unit of space and minimize deterioration. By providing projections to bumper member 24 and fixing the projection into holes provided on sidewall 16 (not shown in the drawings), the unity of the connection can be strengthened.

Figure 15:
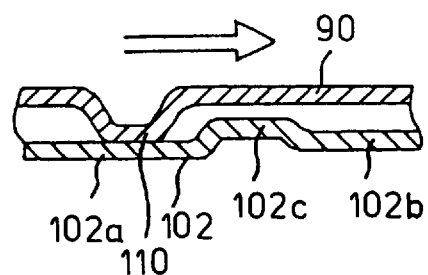
FIG. 15 is a developed sectional view showing the relation between a locking member/central plate and a lid panel.

As shown in FIG. 11, along the length sides of lid panels 12 are provided apertures 94 for small wiring and covered window portion 98 for ordinary wiring. The window portion can be opened by either bending downward or removing the piece of plate the window portion at slit or hole 96. In this embodiment, vertical wall 30 of lid panel 12 extends fully to the end of the panel because, when a load is placed on the ends of the panel, if the vertical wall does not extend to the end, the panel may rise. Extending the vertical wall to both ends will prevent the rising of the panel as the load can be born at the ends of the panel, too. Lowered step 32 at the ends of lid panel 12 is formed in a semicircular shape in relation to the locking member 90. Slit 100 is provided on lowered step 32 along breadth sides of the lid panel and the outside of slit 100 constitutes bending portion 102. Bending portion 102 is composed of the lowest portion 102a, middle-height portion 102b and the highest portion 102c as shown in FIG. 15. The reason for this formation shall be explained later.

Figure 13A:
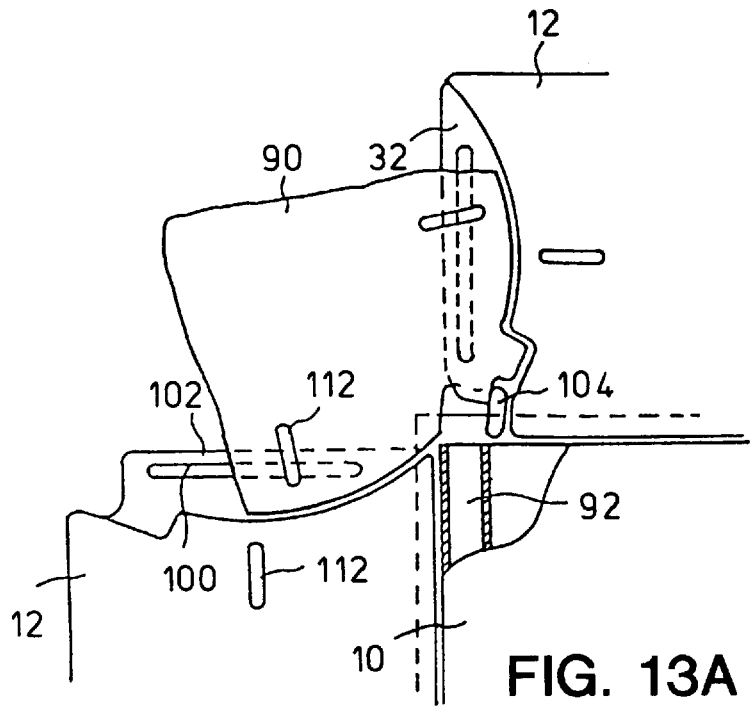
Fig. 13 is a plan view showing the relation between a panel block, lid panels and a locking member/central plate in accordance with the present invention.
Figure 13B:
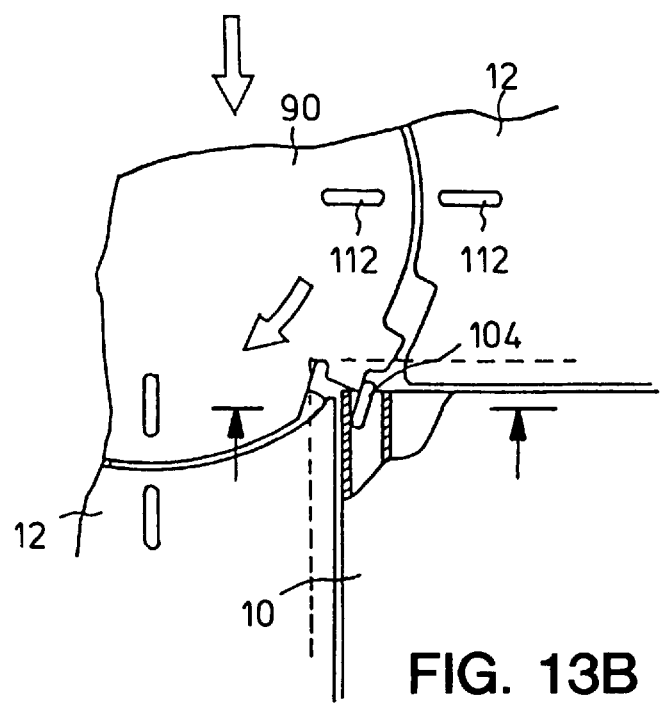
Figure 14:
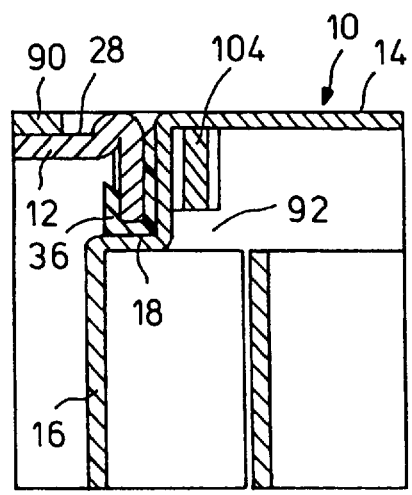
FIG. 14 is an enlarged sectional view of A—A in FIG. 13.

Locking member 90 is in a circular shape and is placed on lowered step 32 of lid panel 12 and has four stopper tongues 104 around the circumference. The locking member is rotated and the stopper tongue is inserted into opening 92 on panel block 10. FIG. 13 is a plan view showing the relation between locking member 90, panel block 10 and lid panel 12. FIG. 14 is an enlarged cross sectional view at A—A in FIG. 13. By putting locking member 90 in place and rotating it on lowered step 32 of lid panel 12, stopper tongue 104 enters into opening 92 whereby panel block 10 and lid panel 12 are pressed from both top and bottom and combined as one unit. Two holes 106 are provided along the central line on the upper surface of the locking member, into which a specialized tool is inserted to rotate the locking member. By providing a slot groove 108 in the center of locking member 90 into which a portion of the circumference of another locking member 90 can be inserted or applied, a locking member can be used as a tool to rotate another locking member.

FIG. 15 is a developed sectional view showing the contact between locking member 90 and lowered step 32 of lid panel 12. Locking member 90 is provided with indentation 110 which, in compliance with the rotation of locking member, is made to slide on bending portion 102 from the lowest portion 102a, over the highest portion 102c and to middle-height portion 102b. Bending portion 102 must be bent utmost when the locking member slides over the highest portion 102c and is bent moderately at middle-height portion 102b, thus locking member 90 is prevented from loosening by portion 102c and firmly locked at portion 102b. The completion of locking can be confirmed by providing adjusting marks 112 on lid panel 12 and locking member 90. As stopper tongue 104 of locking member 90 is formed with certain vertical thickness, the same can prevent panels from slipping off when the panel received a shock while tentatively placed on the floor before locking. Stopper tongue 104 also increases strength. It is also possible to provide a hole in the center of locking member 90 and install a floor electrical outlet directly, although such installation is not shown in the drawings.

Figure 16:
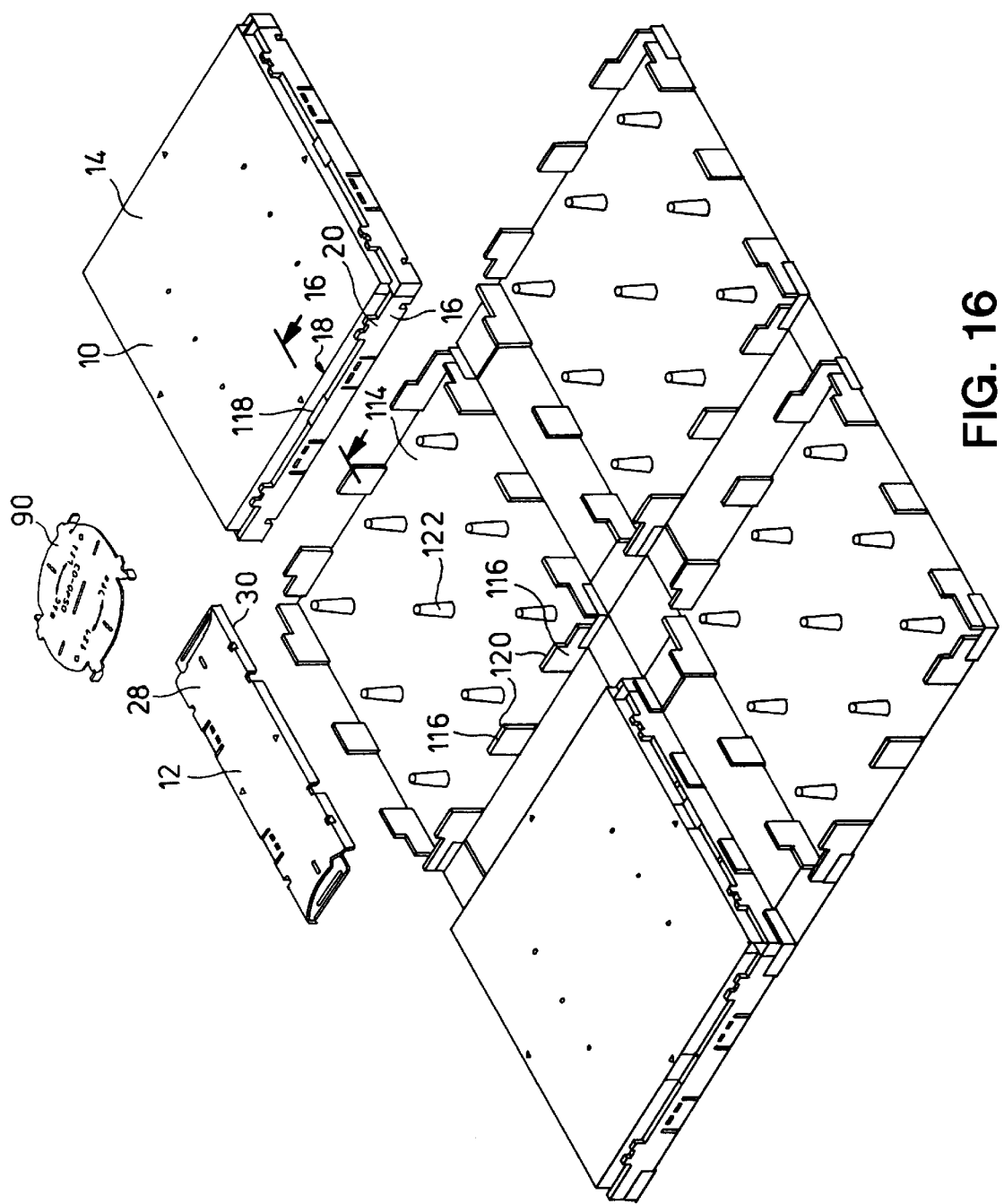
FIG. 16 is a perspective view showing the relation between a panel block, a lid panel and a locking member/central plate in accordance with the present invention.
Figure 17:
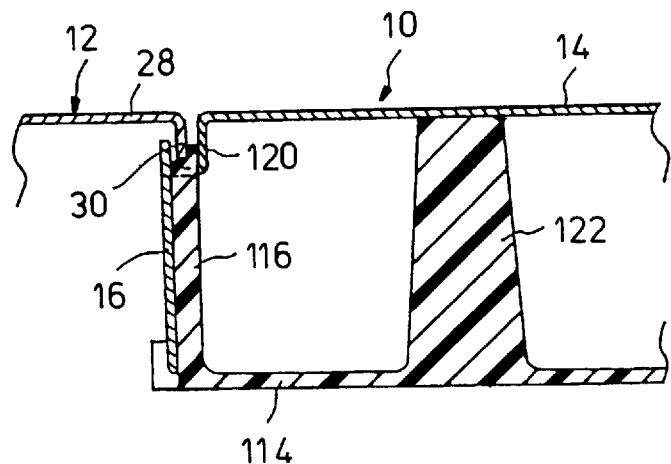
FIG. 17 is a sectional view of B—B in FIG. 16.

As was explained before, another means for connecting panel units into panel blocks is by placing panel units on an appropriate plastic sheets, wherein the plastic sheet functions as reinforcement material and as bumper material too. FIG. 16 is a perspective view showing such formation and FIG. 17 is a sectional view at B—B in FIG. 16. In this embodiment, four panel blocks (although this should be correctly termed as "panel units", the term "panel blocks" is used here because the structure and shape are practically the same. The terms "lid panel" and "locking member" are used in the same sense.) and four lid panels compose one panel block 10 on plastic sheet 114. Rectangular projections 116 are provided on plastic sheet 114, one in the center and two on both ends of each of the four sides of the panel block. Panel block 10 is in a similar shape, although the size is smaller, to the panel block which was explained in the previous embodiment. The few differences include the point that upward wall 20 of slot insert 18 is cut out from the side wall and the bottom of slot insert 18 constitutes a slit.

The position of panel block 10 is determined by inserting rectangular projection 116 into slit 118 (and therefore the center of sidewall 16 of panel block 10 is not inwardly indented). Groove 120 is formed on top of rectangular projection 116 and vertical wall 30 of lid panel 12 is inserted into groove 120, thereby rectangular projection 116 serves as a bumper member 36 as well. Further, the corner side of the rectangular projection on the four corners is made one step lower. This lowered portion supports the flat portion at the back of upper surface 14 of panel block 10, thereby reinforcing the support of the panel blocks. Also, columnar projections 122 are formed on plastic sheet 114 with an appropriate interval for supporting the back of upper surface 14 of panel block 10, thereby preventing the surface 14 from hanging. The structure of lid panel 12 and locking member 90 are the same as in the aforementioned embodiment. Thus, the upper portion of panel blocks 10 and lid panels 12 form a scrummage. This scrummage and the connection by way of plastic sheet 114 at its lower portion complete a total combination of panel blocks and lid panels, which can be more easily handled as a module.

Figure 8:
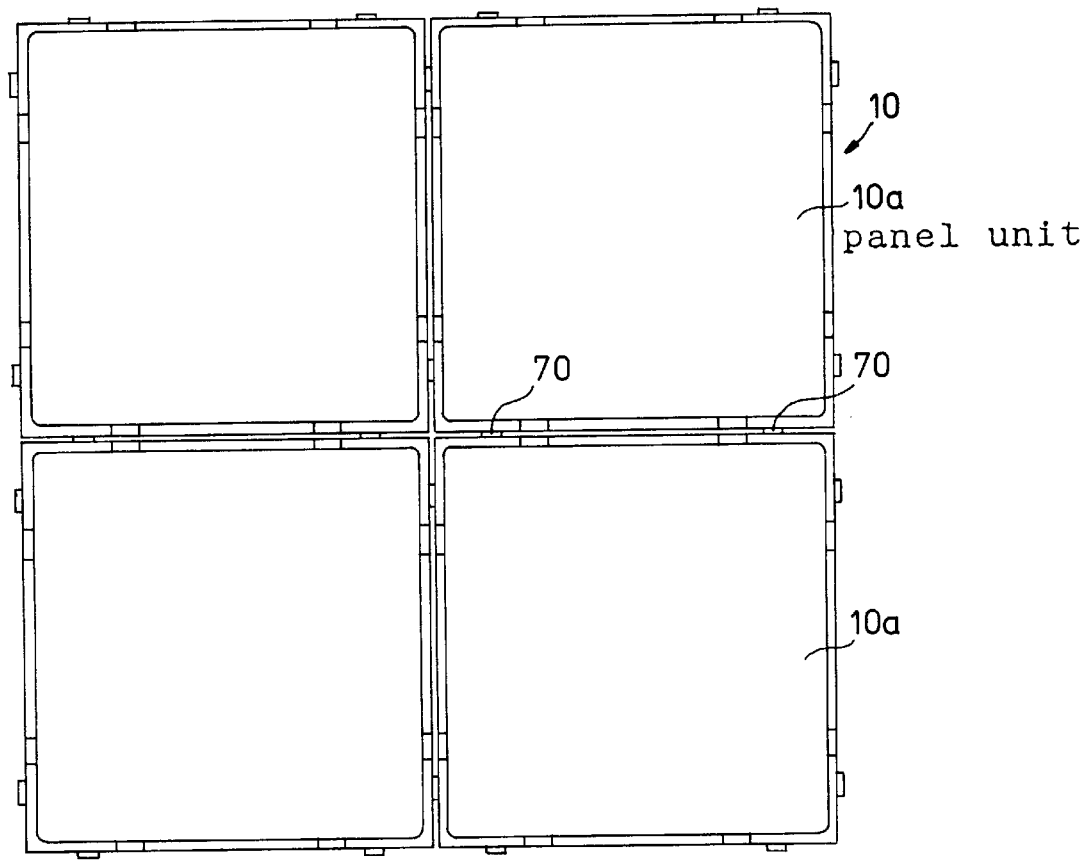
FIG. 8 is a plan view of a panel block in accordance with the present invention.
Figure 9:
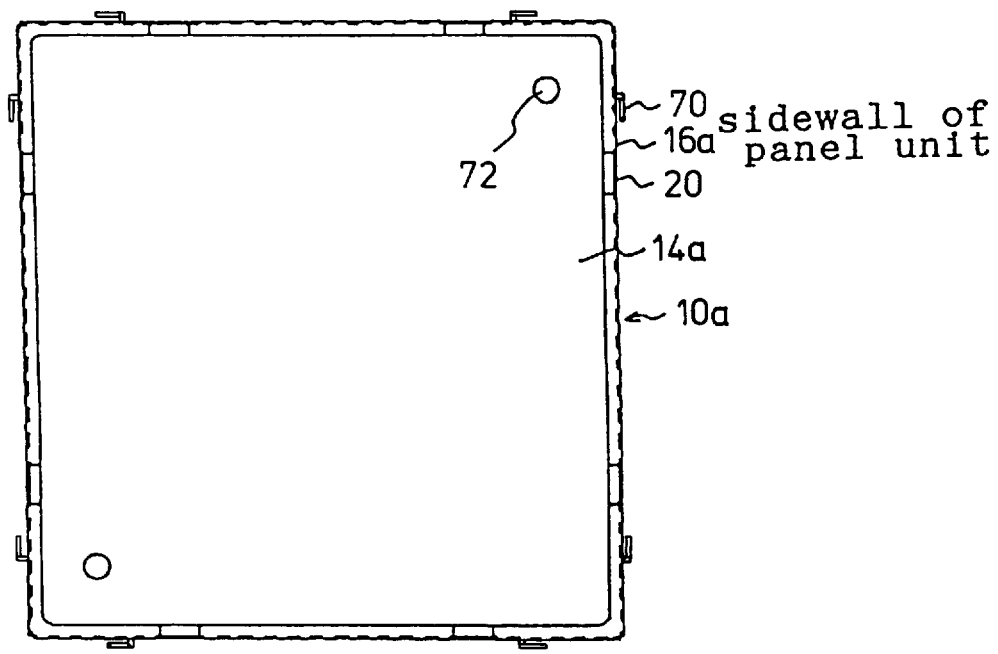
FIG. 9 is a plan view of a panel unit from which panel blocks are made in accordance with the present invention.
Figure 10:
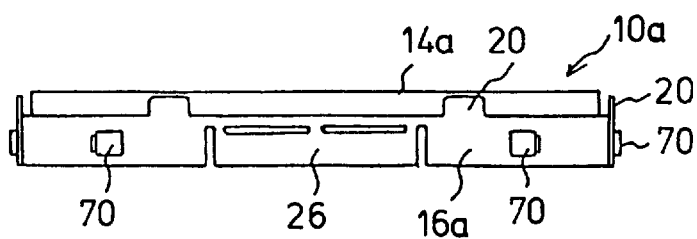
FIG. 10 is a side view of a panel unit from which panel blocks are made in accordance with the present invention.

FIG. 8 is a plan view showing another embodiment of panel block 10. FIG. 9 is a plan view and FIG. 10 is a side view of panel units 10a which comprise panel block 10. In this embodiment, a plurality of panel units (here is shown as a panel block comprising four panel units, but this number is not limited to four) compose one panel block 10. Each panel unit 10a must be connected so that positioning is fixed. Connector projection 70 are cut in L-letter shape on sidewall 16a and are connected with each other. As such, theconnection projections do not hinder the connection of the panel unit and the lid panel, a panel block may be composed of one or a plurality of panel units. On the other hand, panel unit 10a and panel block 10 can be different in size and shape. It is appropriate to provide two connector projections 70 on each sidewall 16a, wherein the connector projections of one sidewall 16a project inwardly and those of adjacent sidewall 16a project outwardly so that all panel units 10a can be connected each other. Moreover, hole 72 is provided on the corners of upper surface 14a of panel unit 10a so that a tool can be applied thereto when raising panel units for installation or dismantling.

The groove for wiring is provided between panel blocks 10. Such grooves may be provided between panel blocks 10 composed of a plurality of panel units 10a, or, between those composed of a plurality of panel units and those composed of a single panel unit 10a. In all cases, the size of lid panel 12 must be matched with the size of panel block 10 for covering provided grooves. As such, the ratio in size of space for grooves against space of panel blocks 10 can be changed, which brings about such desirable effects as being able to secure the necessary wiring space according to the volume of wiring.

While further developing such a formation, grooves for wiring can be secured in the space under panel units 10a or panel blocks 10 which themselves can replace the lid panels. That is, while covering the whole floor with panel units 10a or panel blocks 10 without providing grooves, wiring can be arranged through wiring window 26 of panel unit 10a by removing beforehand the piece of sidewall at wiring window portion 26. (Panel units 10a which are planned to be used as such may be provided with a wiring gate instead of providing wiring window portion 26.) When such a formation is adopted, panel units 10a are connected with each other by connector projection 70 and there are no positioning problems. In this operation, lid panels are not required and the work for providing grooves can be spared, which makes the number of parts smaller, the cost lower and the work easier.

Industrial Applicability

The invention under the present application was described as above, in which the vertical wall of the lid panel is held at the slot insert of the panel block. This eliminates noise and strengthens the resistance of lid panels against coming loose due to earthquakes and other shaking. Further, panel blocks and lid panels are interconnected and their relative position is fixed so that they cannot slide off from each other. As the positioning of panel blocks and lid panels are both fixed, it is not necessary to draw lines on the floor beforehand nor place only of panel blocks first. Instead, panel blocks and lid panels can be assembled alternately, thus the construction attains a high efficiency.

We claim:

1. An access floor system having
   (1) a plurality of panel blocks, each panel block being of a single panel unit, said panel blocks having a flat upper surface, sidewalls and U-shaped slot inserts which are formed at a middle portion of said sidewalls,
   (2) a groove structure formed between a plurality of panel blocks and capable of containing wiring in said groove structure,
   (3) a plurality of lid panels, each of said lid panels comprising a flat upper horizontal wall surface and vertical walls depending therefrom, and
   (4) at least one locking central plate;
   wherein said panel units are placed in squares; said groove structure being covered by said lid panels with said vertical walls of said lid panels being inserted into said U-shaped slot inserts of said panel blocks; a plurality of said lid panels forming at least one lid panel juncture area; and said at least one locking central plate covering said groove structure in the space remaining at said at least one lid panel juncture area; and said at least one locking central plate capable of locking said panel blocks and said lid panels into a single assembled unit by pressing from top and bottom with rotating action.

2. An access floor system having
   (1) a plurality of panel blocks, each panel block being of a plurality of single panel units, said panel units having a flat upper surface, sidewalls, U-shaped slot inserts which are formed at a middle portion of said sidewalls, and connector projections, said panel units being connected to one another to form panel blocks by said connector projections;

(2) a groove structure formed between a plurality of panel blocks and capable of containing wiring in said groove structure, (3) a plurality of lid panels, each of said lid panels comprising a flat upper horizontal wall surface and vertical walls depending therefrom, and (4) at least one locking central plate;

wherein said panel blocks are placed in squares; said groove structure being covered by said lid panels with said vertical walls of said lid panels being inserted into said U-shaped slot inserts of said panel units; a plurality of said lid panels defining at least one lid panel juncture area; and said at least one locking central plate covering said groove structure in the space remaining at said at least one juncture area; and said at least one locking central plate capable of locking said panel blocks and said lid panels into a single assembled unit by pressing from top and bottom with rotating action.

3. The access floor system of claim 1 or 2 wherein said panel blocks and said lid panels are made of steel plate.

4. The access floor system of claim 1 or 2 wherein a bumper material is attached to the vertical walls of said lid panels and fixed in place when said vertical walls of said lid panels are inserted into said slot inserts.

5. The access floor system of claim 4 wherein said panel blocks and said lid panels are made of steel plate.

6. The access floor system of claim 1 or 2 wherein said panel units further comprise a wiring window portion, which wiring window portion is impressed into the sidewalls of said panel units and is removable by bending and snapping off.

7. The access floor system of claim 6 wherein said panel blocks and said lid panels are made of steel plate.

8. The access floor system of claim 6 wherein a bumper material is attached to the vertical walls of said lid panels and fixed in place when said vertical walls of said lid panels are inserted into said slot inserts.

9. The access floor system of claim 8 wherein said panel blocks and said lid panels are made of steel plate.

* * * * *